United States Patent [19]
Cady et al.

[11] Patent Number: 5,519,102
[45] Date of Patent: May 21, 1996

[54] AQUEOUS POLYMERIZATION METHOD FOR POLY(ISOPROPENYLPHOSPHONIC ACID)

[75] Inventors: Michael A. Cady, Yardley; William S. Carey, Ridley Park; Andrew Solov, Holland, all of Pa.

[73] Assignee: Betz Laboratories, Inc., Trevose, Pa.

[21] Appl. No.: 437,340

[22] Filed: May 9, 1995

[51] Int. Cl.[6] .......................... C08F 30/02; C08F 130/02
[52] U.S. Cl. ..................... 526/278; 526/218.1; 526/229; 562/20
[58] Field of Search ................ 526/218.1, 229, 526/278; 562/20

[56] References Cited

U.S. PATENT DOCUMENTS 4,446,028  5/1984  Becker ..................... 210/697
4,446,046  5/1984  Becker ..................... 252/181

*Primary Examiner*—James J. Seidleck
*Assistant Examiner*—Rabon Sergent
*Attorney, Agent, or Firm*—Alexander D. Ricci; Steven D. Boyd

[57] ABSTRACT

A method of preparing poly(isopropenylphosphonic acid) is disclosed, which provides a high yield with low initiator charge. The method comprises preparing poly(isopropenylphosphonic acid) by polymerizing a mixture of isopropenylphosphonic acid and isopropenylphosphonic acid anhydride, preferably in an aqueous solution.

6 Claims, No Drawings

AQUEOUS POLYMERIZATION METHOD FOR POLY(ISOPROPENYLPHOSPHONIC ACID)

FIELD OF THE INVENTION

The present invention relates to methods of synthesizing poly(isopropenylphosphonic acid) comprising polymerization of an isopropenylphosphonic acid anhydride/isopropenylphosphonic acid monomer mixture. More particularly, the present invention relates to the synthesis of poly(isopropenylphosphonic acid) in aqueous systems comprising polymerization of an isopropenylphosphonic acid anhydride/isopropenylphosphonic acid monomer mixture.

BACKGROUND OF THE INVENTION

The use of homopolymers having a repeat unit represented by the structural formula:

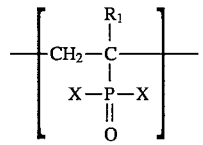

wherein $R_1$ is lower alkyl of from 1 to about 6 carbon atoms, and wherein X=OH, or OM where M is a cation; for controlling the formation of mineral deposits and inhibiting corrosion in aqueous systems or surfaces exposed to aqueous systems is disclosed in U.S. Patent No. 4,446,046. The preferred polymer is poly(isopropenylphosphonic acid) (PIPPA: R=$CH_3$, X=OH). The preparation of PIPPA is disclosed therein as beginning with the preparation of isopropenylphosphonic acid (IPPA) by a reaction mechanism involving the nucleophilic addition of $PCl_3$ to the carbonyl group of a compound corresponding to the desired alpha-beta ethylenically unsaturated phosphonic acid. Upon isolation of the desired monomer, radical chain addition polymerization in bulk, suspension, solution, emulsion or thermal polymerization form is undertaken.

The polymerization of IPPA is exemplified in '046 by both non-aqueous and aqueous procedures. In the non-aqueous suspension polymerization procedure, the IPPA is dissolved in an organic solvent, polymerized by addition of an organic soluble initiator, the crude polymer is isolated by filtration, washed with acetone, and purified by vacuum stripping to remove residual volatile organics to yield a water soluble solid. The aqueous solution polymerization procedure involves treating an alkaline aqueous solution of IPPA with a water soluble polymerization initiator such as ammonium persulfate.

The aqueous polymerization methods are preferred from an economic standpoint since they do not incorporate the use of costly organic solvents and the time intensive separation and purification (with respect to volatile organics) operations associated with the non-aqueous preparation methods. Conversion to PIPPA for the prior art aqueous procedures, however, are typically limited to about 60%, even with high initiator addition; whereas the non-aqueous methods provide conversions of approximately 80%.

SUMMARY OF THE INVENTION

The present inventors have discovered a high yield, aqueous polymerization technique for preparing poly(isopropenylphosphonic acid). The present invention provides a low cost, aqueous based polymerization mechanism. The method of the present invention provides conversion yields unexpectedly higher than prior art aqueous based methods at lower initiator charges. The present invention thus provides a novel, low cost means of preparing poly(isopropenylphosphonic acid). The method of the present invention comprises preparing poly(isopropenylphosphonic acid) by polymerizing a mixture of isopropenylphosphonic acid and isopropenylphosphonic acid anhydride in an alkaline aqueous solution. The polymerization is initiated with a conventional water soluble persulfate or azo initiator.

DESCRIPTION OF THE PREFERRED EMBODIMENT

In accordance with the present invention, it has been surprisingly discovered that poly(isopropenylphosphonic acid) (PIPPA) can be prepared at significantly increased conversion percentages by aqueous polymerization of an isopropenylphosphonic acid anhydride (IPPAA)/isopropenylphosphonic acid (IPPA) monomer mixture. The increased polymer conversion of the present invention is achieved utilizing a significantly lower amount of initiator. The use of lower concentrations of initiator is significant; for example, when the PIPPA is to be employed in a high pressure boiler system where decomposition of persulfate initiators can form undesirable sulfate contaminants.

The method of preparing PIPPA of the present invention utilizes a mixture of IPPA and IPPAA where the mole % of IPPAA in the monomer mixture is at least about 30% to 100%, preferably from about 40% to 80%. The pH of the aqueous monomer solution is adjusted to pH 3 to 10 with aqueous base prior to polymerization initiation.

In the method of the present invention, it is preferred to add the monomer to the caustic solution in adjusting the pH. This order of addition increases polymer yield by minimizing hydrolysis of the IPPAA. The present inventors discovered that IPPAA was more stable to aqueous hydrolysis under basic conditions but readily hydrolyzed under acidic conditions. The unexpected polymer yield of the present invention is directly related to the concentration of IPPAA in the monomer mixture.

The initial solids content of the monomer salt solution is preferably from about 20 to 70%. It was discovered that polymer conversion increased with increasing reaction solids. Maximum polymer conversion was achieved by conducting polymerization at the highest possible concentration at which the monomer solution was homogeneous.

The polymerization is typically conducted under atmospheric conditions at a temperature of from about 50° C. to 100° C. Upon heating to the desired reaction temperature, the initiator feed is started. Polymer yield was found to increase with extended initiator feeds up to about 10 hours. Little or no benefit resulted in extending the feed period beyond about 10 hours.

After feed of the initiator is complete, the reaction mixture is held at the reaction temperature for periods of up to about 2 hours. No improvement in polymer conversion resulted by extending the polymerization hold period for longer than about 2 hours.

Water soluble polymerization initiators suitable for use in the present invention are well known in the art and include persulfate and azo compounds. Typically from about 1 to 10 mole % initiator (as mole equivalent of IPPA) is charged as an aqueous solution over a 0.5 to 24 hour period. After addition of the initiator solution, the batch is held at the reaction temperature for from about 0.5 to up to 4 hours before isolating the product as an aqueous solution.

In a particularly preferred embodiment of the present invention, a monomer mixture of about 50% of IPPAA and about 50% of IPPA, in an aqueous solution at pH 4 to 7 with a solids content of from 45 to 65% is polymerized at a temperature of from about 80° C. to 100° C. From about 2.5 to 5.0 mole % of initiator is fed to the monomer mixture over a period of from about 4 to 10 hours and the reaction temperature held for 2 to 4 hours thereafter. The resulting conversion of monomer to polymer is determined to be about 75 mole % based upon area of the peaks in the $^{31}$P NMR spectrum.

The use of an IPPA/PPAA monomer mixture would also be expected to exhibit increased polymer conversion in non-aqueous homopolymerization procedures and in aqueous and non-aqueous copolymerization procedures.

The present invention will now be further described with reference to a number of specific examples which are intended to be illustrative, and not as restricting the scope of the invention as defined in the claims.

EXAMPLES

Example I

A suitable reactor vessel was equipped with a mechanical stirrer, thermometer, condenser, nitrogen sparge, and addition ports. Aqueous caustic (50 wt. %, 31.15 g, 0.389 mole) and 31 ml of deionized water were charged to the reactor. The solution was sparged with nitrogen and a 29.4 wt. % IPPA/70.6 wt. % IPPAA mixed monomer solution (45.0 g, 0.108 mole IPPA, 0.141 mole IPPAA) was charged dropwise over a 35 minute period with cooling. The resulting beige-colored solution was then heated to 80° C., and a sodium persulfate solution (17.3 wt. %, 26.89 g, 0.0195 mole) was charged dropwise over a 10 hour period. The batch was then held for 2 hours at 80° C., after which the pH of the solution was adjusted to 9 with 50 wt. % caustic and the solids were adjusted to 30 wt. % with deionized water yielding a clear, light yellow-tinted solution. 31 p NMR analysis of the product showed numerous broad polymer peaks at δ=–20 to –35 ppm. The conversion of monomer to polymer was determined to be 78.5 mole % by dividing the sum of the area of these peaks by the total peak integration for the $^{31}$P NMR spectrum.

Example II

The procedure of Example I was followed with the initiator charge increased to 7.5 mole % of the monomer charge (as mole equivalent IPPA) and the initiator solution feed was reduced to 4 hours. The conversion of monomer to polymer was determined to be 75.6 mole % via integration of the $^{31}$P NMR spectrum.

Example III

The procedure of Example I was followed with the initiator charge decreased to 1.0 mole % of the monomer charge (as mole equivalent IPPA) and the initiator solution feed was increased to 22 hours. The conversion of monomer to polymer was determined to be 54.7 mole % via integration of the $^{31}$P NMR spectrum.

Example IV

The procedure of Example I was followed with the polymerization conducted at 95° C. The conversion of monomer to polymer was determined to be 79.7 mole % via integration of the $^{31}$P NMR spectrum.

Example V

The procedure of Example I was followed with the initiator charge reduced to 2.5 mole % of the monomer charge (as mole equivalent IPPA). The conversion of monomer to polymer was determined to be 70.3 mole % via integration of the $^{31}$P NMR spectrum.

Example VI

The procedure of Example I was followed with 2,2'-azobis[2-amidinopropane]dihydrochloride utilized as the initiator and the initiator solution feed was decreased to 4 hours. The conversion of monomer to polymer was determined to be 62.9 mole % via integration of the $^{31}$P NMR spectrum.

Example VII

The procedure of Example IV was followed employing a 20.3 wt. % IPPA/79.7 wt. % IPPAA mixed monomer solution. The conversion of monomer to polymer was determined to be 77.2 mole % via integration of the $^{31}$P NMR spectrum.

Comparative Example I

This sample was prepared according to Example 3 of U.S. Pat. No. 4,446,046. The conversion of monomer to polymer was determined to be 62.8 mole % via integration of the $^{31}$P NMR spectrum.

Comparative Example II

The procedure of Comparative Example I was followed with the total initiator charge reduced to 5 mole % of the IPPA charge. The conversion of the monomer to polymer was determined to be 49.6 mole % via integration of the $^{31}$P NMR spectrum.

The results are summarized in Table I. It can be seen from these results that there is a substantial increase in polymer conversion for the present invention at much lower initiator levels relative to U.S. Pat. No. 4,446,046.

TABLE 1

| Example | Monomer Composition (Mole %) | Initiator Charge (Mole %)[1] | Polymer Conversion (Mole %)[2] |
|---|---|---|---|
| Example I | 56% IPPAA/44% IPPA | 5.0 | 78.5 |
| Example II | 56% IPPAA/44% IPPA | 7.5 | 75.6 |
| Example III | 56% IPPAA/44% IPPA | 1.0 | 54.7 |
| Example IV | 56% IPPAA/44% IPPA | 5.0 | 79.7 |
| Example V | 56% IPPAA/44% IPPA | 2.5 | 70.3 |
| Example VI | 56% IPPAA/44% IPPA | 5.0 | 62.9 |
| Example VII | 68% IPPAA/32% IPPA | 5.0 | 77.2 |
| Comparative Example I | 100% IPPA | 13.5 | 62.8 |
| Comparative Example II | 100% IPPA | 5.0 | 49.6 |

[1] As mole equivalent IPPA.
[2] Via $^{31}$P NMR integration.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A method of forming a water soluble poly(isopropenylphosphonic acid) having repeat units represented by the formula

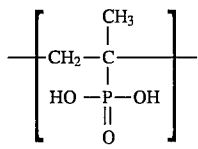

comprising aqueous polymerization of a mixture of isopropenylphosphonic acid and isopropenylphosphonic acid anhydride.

2. The method of claim 1 wherein said polymerization is conducted in an aqueous caustic solution employing a water soluble initiator.

3. The method of claim 2 wherein the mole ratio of isopropenylphosphonic acid anhydride to isopropenylphosphonic acid ranges from about 40:60 to about 80:20 mole %.

4. The method of claim 2 wherein said water soluble polymerization initiator is selected from the group consisting of persulfate and azo compounds.

5. The method of claim 1 wherein the pH of said mixture is adjusted to pH 3 to 10 with aqueous base prior to polymerization.

6. The method of claim 5, wherein said mixture is added to said aqueous base.

* * * * *